US012459538B2

(12) United States Patent
Schmidt et al.

(10) Patent No.: US 12,459,538 B2
(45) Date of Patent: Nov. 4, 2025

(54) SELF-DRIVING VEHICLE PATH ADAPTATION SYSTEM AND METHOD

(71) Applicant: Seegrid Corporation, Pittsburgh, PA (US)

(72) Inventors: Benjamin George Schmidt, Wexford, PA (US); Ryan Young, Pittsburgh, PA (US)

(73) Assignee: SEEGRID CORPORATION, Pittsburgh, PA (US)

( * ) Notice: Subject to any disclaimer, the term of this patent is extended or adjusted under 35 U.S.C. 154(b) by 399 days.

(21) Appl. No.: 17/197,516

(22) Filed: Mar. 10, 2021

(65) Prior Publication Data

US 2021/0284198 A1 Sep. 16, 2021

Related U.S. Application Data

(60) Provisional application No. 63/085,416, filed on Sep. 30, 2020, provisional application No. 62/987,562, filed on Mar. 10, 2020.

(51) Int. Cl.
*B60W 60/00* (2020.01)
*B60W 30/09* (2012.01)
(Continued)

(52) U.S. Cl.
CPC ........ *B60W 60/0015* (2020.02); *B60W 30/09* (2013.01); *B60W 30/0956* (2013.01);
(Continued)

(58) Field of Classification Search
CPC ............ B60W 60/0015; B60W 30/09; B60W 30/0956; B60W 30/143; B60W 2420/40;
(Continued)

(56) References Cited

U.S. PATENT DOCUMENTS 7,446,766 B2 11/2008 Moravec
9,592,961 B2 3/2017 Weiss
(Continued)

FOREIGN PATENT DOCUMENTS

EP 2837473 2/2015
EP 3453672 3/2019
(Continued)

OTHER PUBLICATIONS

International Search Report and Written Opinion dated May 20, 2021 issued in corresponding International Application No. PCT/US2021/021638.

(Continued)

*Primary Examiner* — Aniss Chad
*Assistant Examiner* — Nikki Marie M Molina
(74) *Attorney, Agent, or Firm* — Onello & Mello, PC

(57) ABSTRACT

Provided is a path adaptation system and method for a self-driving vehicle, and a self-driving vehicle including path adaptation technology. The method includes providing a vehicle navigation path through an environment; determining a location of the vehicle relative to the path; generating one or more polygons representing a shape of the vehicle projected from the vehicle location in a vehicle travel direction long the path; combining the one or more projections into a projected motion polygon; acquiring object information representing an object shape from one or more sensors; and determining if the object shape overlaps the projected motion polygon. If so, the method includes adjusting the vehicle navigation. If not, the method includes, continuing navigation along the path. The path adaptation system includes one or more processors configured to execute the path adaptation method.

20 Claims, 11 Drawing Sheets

100
X
Z
Y
500

(51) Int. Cl.
*B60W 30/095* (2012.01)
*B60W 30/14* (2006.01)
*G01C 21/34* (2006.01)

(52) U.S. Cl.
CPC ....... *B60W 30/143* (2013.01); *G01C 21/3407* (2013.01); *B60W 2420/40* (2013.01); *B60W 2420/408* (2024.01); *B60W 2420/54* (2013.01)

(58) Field of Classification Search
CPC ......... B60W 2420/52; B60W 2420/54; B60W 2420/62; B60W 30/0953; B60W 30/095; G01C 21/3407; G05D 2201/0216; G05D 1/024; G05D 1/0251; G01S 17/931; G06V 20/56
See application file for complete search history.

(56) References Cited

U.S. PATENT DOCUMENTS

| | | | | |
|---|---|---|---|---|
| 9,690,293 | B2 | 6/2017 | Shashua et al. | |
| 9,796,378 | B2 | 10/2017 | Tsuruta et al. | |
| 10,037,613 | B1 * | 7/2018 | Becker | G06T 7/277 |
| 2006/0064212 | A1 | 3/2006 | Thorne | |
| 2006/0178828 | A1 * | 8/2006 | Moravec | G06V 20/10 345/424 |
| 2014/0032184 | A1 * | 1/2014 | Carrasco | G06F 30/20 703/1 |
| 2014/0200801 | A1 | 7/2014 | Tsuruta et al. | |
| 2015/0073586 | A1 * | 3/2015 | Weiss | B65G 1/1378 901/1 |
| 2017/0010614 | A1 * | 1/2017 | Shashua | G01S 5/0027 |
| 2019/0050000 | A1 | 2/2019 | Kennedy et al. | |
| 2019/0172358 | A1 | 6/2019 | Zhou et al. | |
| 2021/0370921 | A1 * | 12/2021 | Silva | B60W 60/0027 |
| 2022/0107646 | A1 * | 4/2022 | Blake | B60W 60/0027 |

FOREIGN PATENT DOCUMENTS

| | | |
|---|---|---|
| JP | 2016081403 | 5/2016 |
| WO | 2019116518 | 6/2019 |
| WO | 2019166518 | 9/2019 |

OTHER PUBLICATIONS

Extended European Search Report dated Jan. 23, 2024 issued in European Application No. 21767722.8.

Canadian Office Action dated Mar. 14, 2024 issued in Canadian Application No. 3166449.

Extended European Search Report dated Apr. 4, 2025 issued in European Application No. 25158425.6.

* cited by examiner

SELF-DRIVING VEHICLE PATH ADAPTATION SYSTEM AND METHOD

CROSS REFERENCE TO RELATED APPLICATIONS

This application claims priority to a provisional application entitled, Self-Driving Vehicle Path Assist System and Method, and having provisional application No. 62/987,562, filed Mar. 10, 2020, which is hereby incorporated by reference in its entirety.

This application claims priority to a provisional application entitled, Vehicle Object-Engagement Scanning System and Method, and having provisional application No. 63/085,416, filed Sep. 30, 2020, which is hereby incorporated by reference in its entirety.

FIELD OF INTEREST

The present inventive concepts relate to systems and methods in the field of autonomous vehicles (AVs), and more particularly to systems and methods for adjusting and/or optimizing the path travelled by such vehicles.

BACKGROUND

Self-driving or self-navigating vehicles are becoming increasingly prevalent in many environments, particularly, but not exclusively, in commercial settings. Such vehicles can include or be referred to as autonomous vehicles, automated vehicles, auto-navigating vehicles, and vision-guided vehicles, as examples. Drones can represent a type of autonomous vehicle. Beyond recreational drones for personal use, drones are also gaining use by commercial enterprises, e.g., for deliveries. Also, there has been some experimentation with self-driving automobiles on the roadways, which is certain to continue.

One environment where such vehicles have become particularly useful is warehouse environments, e.g., environments that receive, store, and then transport goods. In such environments, the goods tend to be transient. Received goods are moved to storage locations in the environment, where they are temporarily stored awaiting subsequent disposition.

A storage facility is a facility primarily used for storage of goods for commercial purposes, such as a warehouse. The storage is generally intended to be temporary, as such goods ultimately may be intended for a retailer, consumer or customer, distributor, transporter or other subsequent receiver. A warehouse can be a standalone facility, or can be part of a multi-use facility. Thousands of types of items can be stored in a typical warehouse. The items can be small or large, individual or bulk. It is common to load items on a pallet or in carts for transportation, and the warehouse may use pallets and tuggers as a manner of internally transporting and storing such items.

A well-run warehouse is well-organized and maintains an accurate inventory of goods. Goods can come and go frequently, throughout the day, in a warehouse. In fact, some large and very busy warehouses work three shifts, continually moving goods throughout the warehouse as they are received or needed to fulfill orders. Shipping and receiving areas, which may be the same area, are the location(s) in the warehouse, where large trucks pick-up and drop-off goods. The warehouse can also include a staging area—as an intermediate area between shipping and receiving and storage aisles within the warehouse where the goods are stored. The staging area, for example, can be used for confirming that all items on the shipping manifest were received in acceptable condition. The staging area can also be used to build orders and pallets to fulfill orders that are to be shipped.

Goods in a warehouse tend to be moved in one of two ways, either by pallet or by cart (or trailer). A pallet requires a pallet transport for movement, such as a pallet jack, pallet truck, forklift, or stacker. A stacker is a piece of equipment that is similar to a fork lift, but can raise the pallet to significantly greater heights, e.g., for loading a pallet on a warehouse shelf. A cart requires a tugger (or "tow tractor"), which enables a user to pull the cart from place to place.

A pallet transport can be manual or motorized. A traditional pallet jack is a manually operated piece of equipment, as is a traditional stacker. When a pallet transport is motorized, it can take the form of a powered pallet jack, pallet truck, or forklift (or lift truck). A motorized stacker is referred to as a power stacker. A motorized pallet jack is referred to as a powered pallet jack, which an operator cannot ride, but walks beside. A pallet truck is similar to a powered pallet jack, but includes a place for an operator to stand.

As with motorized pallet transports, a tugger can be in the form of a drivable vehicle or in the form of a powered vehicle along the side of which the operator walks. In either form, a tugger includes a hitch that engages with a companion part on the cart, such as a sturdy and rigid ring or loop.

Various types of vehicles exist that can navigate without direct reliance on a human driver, such as automated mobile robots (AMRs), autonomous or automated guided vehicle (AGV), vision-guided vehicles (VGV), and autonomous guided carts (AGCs), as examples. For purposes of brevity, such vehicles will be collectively referred to as autonomous vehicles AVs. AV forms of pallet trucks and powered tuggers exist. They are most often used in industrial applications to move materials and/or goods around a manufacturing facility or a warehouse, such as in the case of AV forklifts and AV tuggers.

Such AVs tend to travel according to a pre-planned path, for which the vehicle has often been trained. Such training can include one or more training runs of the path, which is recorded for future use by the AV. The vehicle path takes into account objects, such as walls, installed equipment, and other permanent objects, such that the path avoids such objects. Sensors onboard the AV can detect new or temporary objects encountered during navigation of the path. Current and prior approaches for auto-navigating a vehicle stop the vehicle when any object is detected by the sensors used, which causes the vehicle to even stop for objects that are not in the way-because the sensors sense objects beyond just those in the path of the vehicle. The prior approach, therefore, requires defining paths having wider aisles for operation so such interruptions would be avoided.

SUMMARY

In accordance with aspect of the inventive concepts, provided is a path adaptation method for a self-driving vehicle. The method includes providing a vehicle navigation path through an environment; determining a location of the vehicle relative to the path; generating one or more linear figures representing a cross-sectional outline of a shape of the vehicle projected from the vehicle location in a vehicle travel direction long the path; combining the one or more projections into a projected motion outline; acquiring object information representing an object shape from one or more sensors; and determining if the object shape overlaps the projected motion outline. If so, the method includes adjusting the vehicle navigation. If not, the method includes, continuing navigation along the path.

In various embodiments the cross-sectional outlines are polygons.

In various embodiments a plurality of cross-sectional outlines are combined to form a solid for projection.

In various embodiments the cross-sectional outlines are curvilinear.

In various embodiments the cross-sectional outlines are rectilinear.

In various embodiments, the vehicle is a vision-guided vehicle (VGV).

In various embodiments, the vehicle is a self-driving warehouse vehicle, such as a pallet truck or tugger.

In various embodiments, the vehicle is a self-driving automobile.

In various embodiments, the vehicle is an autonomous robot.

In various embodiments, the object is represented by a point cloud.

In various embodiments, determining if the object shape overlaps the projected motion outline includes determining of at least one point from the point cloud is within the projected motion polygon.

In various embodiments, the one or more sensors include stereo sensors, such as stereo cameras, lidar, and/or sonar.

In various embodiments, determining a location of the vehicle relative to the path includes using forward kinematic projections based on current odometry readings and the planned path of the vehicle.

In various embodiments, the method is performed in real time as the vehicle navigates its path.

In various embodiments, the environment is represented by a 3-dimensional evidence grid.

In various embodiments, the object information is 2-dimensional information.

In various embodiments, the object information is 3-dimensional information.

In various embodiments, adjusting the navigation includes at least one of stopping, redirecting the path, adjusting the speed of the vehicle.

In various embodiments, adjusting the navigation includes to adjusting the path to avoid the object.

In various embodiments, adjusting the navigation includes slowing the vehicle as it approaches the object.

In various embodiments, the width of the outline is about the same width as a width of the vehicle.

In various embodiments, the width of the outline is narrower than an object sensing field on the right and/or left of the vehicle.

In various embodiments, continuing navigation along the path includes ignoring objects within the object sensing field and outside the projected motion outline.

In various embodiments, continuing navigation cannot override an object detection safety system.

In accordance with another aspect of the inventive concepts, provided is a self-driving vehicle, comprising at least one processor coupled to at least one memory; a drive control system; one or more sensors; and a path adaptation module executable by the at least one processor to perform the path adaptation method.

In various embodiments, vehicle further comprises a load storage or tugging apparatus.

In various embodiments, vehicle further comprises an interface to a supervisor and/or management system configured to perform vehicle and/or fleet management and/or monitoring.

In accordance with another aspect of the inventive concepts, provided is a self-driving vehicle path adaptation method as shown and described.

In accordance with another aspect of the inventive concepts, provided is a self-driving vehicle with path adaptation technology as shown and described.

In various embodiments, an automatic vehicle (AV) method includes determining a path of the AV; sensing objects along the path of the AV; generating a 3-dimensional path projection along the path using a linear outline corresponding to a cross-section of the AV or of a load associated with the AV; and determining whether any portion of a sensed object falls within the 3-dimensional path projection and, if so, modifying navigation of the vehicle.

In various embodiments a cross-section is rectilinear.

In various embodiments a cross-section is curvilinear.

In various embodiments generating a path projection employs a plurality of cross-sections.

In various embodiments, generating a path-projection employs a 3-dimensional solid created by combining cross-sections.

In accordance with another aspect of the inventive concepts, provided is a path adaptation method for a self-driving vehicle. The method comprises navigating the vehicle on a planned path through an environment; determining a location of the vehicle relative to the path; projecting the vehicle's travel; acquiring object information representing an object shape from one or more sensors; and determining if the object shape overlaps the path projection and, if so, adjusting the vehicle navigation or, if not, continuing the vehicle navigation along the path. Projecting the vehicle's travel includes generating a shape representing the vehicle and projecting the vehicle shape from the vehicle location along the path to form a plurality of projections and combining the plurality of projections into a path projection within the environment.

In various embodiments, determining a location of the vehicle relative to the path includes processing forward kinematic projections based on current odometry readings for the vehicle.

In various embodiments, the environment is represented by an evidence grid.

In various embodiments, the method further comprises representing the object shape with a point cloud in the evidence grid, wherein points in the point cloud indicate occupancy of a one or more points in space.

In various embodiments, determining if the object shape overlaps the path projection includes determining whether at least one point from the point cloud intersects with or is within the path projection.

In various embodiments, the evidence grid is a 3-dimensional evidence grid and the object information is 3-dimensional object information.

In various embodiments, the one or more sensors include stereo sensors, stereo cameras, lidar, and/or sonar.

In various embodiments, the method further comprises representing the vehicle shape as a polyhedron.

In various embodiments, the method further comprises generating the vehicle shape to have a first width that corresponds to an approximate width of the vehicle, and is not less than the width of the vehicle.

In various embodiments, the method further comprises generating the vehicle shape to have a second width, different from the first width, that represents a width of a load transported by the vehicle.

In various embodiments, generating the path projection includes combining the plurality of projections into a 3-dimensional solid projection tunnel.

In various embodiments, the vehicle generates a right object sensing field and/or a left object sensing field, and the method further includes: enabling the vehicle to navigate on the path when an object is detected in the right and/or left object sensing field, but the object shape does not have a point on or within the projected path.

In various embodiments, adjusting the vehicle navigation includes adjusting a vehicle speed.

In various embodiments, adjusting the vehicle navigation includes slowing without stopping the vehicle.

In various embodiments, adjusting the vehicle navigation includes stopping the vehicle.

In various embodiments, adjusting the navigation includes adjusting the path to avoid the object.

In various embodiments, the vehicle path is a trained path.

In various embodiments, when the vehicle path includes a planned stop, the method includes: projecting the vehicle motion to the trained stop, but not projecting the vehicle motion beyond the trained stop; the vehicle stopping at the trained stop; and resuming projecting the vehicle motion beyond the trained stop when the vehicle is ready to resume navigation.

In various embodiments, when the vehicle path includes a change in direction, the method includes: projecting the vehicle motion in the current direction up to a change of direction point; the vehicle stopping or slowing to change from the current direction to the new direction at the change of direction point; and then the projecting the vehicle motion in the new direction.

In various embodiments, the vehicle is a vision-guided vehicle (VGV) and/or an automated mobile robot (AMR).

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. In the drawings.

DESCRIPTION

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements may be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

In accordance with aspects of the inventive concepts, provided is a path adaptation system and method that use knowledge of where an automated or autonomous vehicle (AV) is going to travel (e.g., a predetermined or trained path) to determine whether a detected object may cause a collision if the vehicle traveled through a space consistent with a path, or whether a detected object may be safely ignored. Inventive concepts allow a self-driving AV to operate in narrower spaces than conventional AVs, allowing for a greater range of applications, including those involving narrow aisles, or doorways, for example. Inventive concepts are applicable to any self-driving AV, such as a mobile robot.

Figure 1:
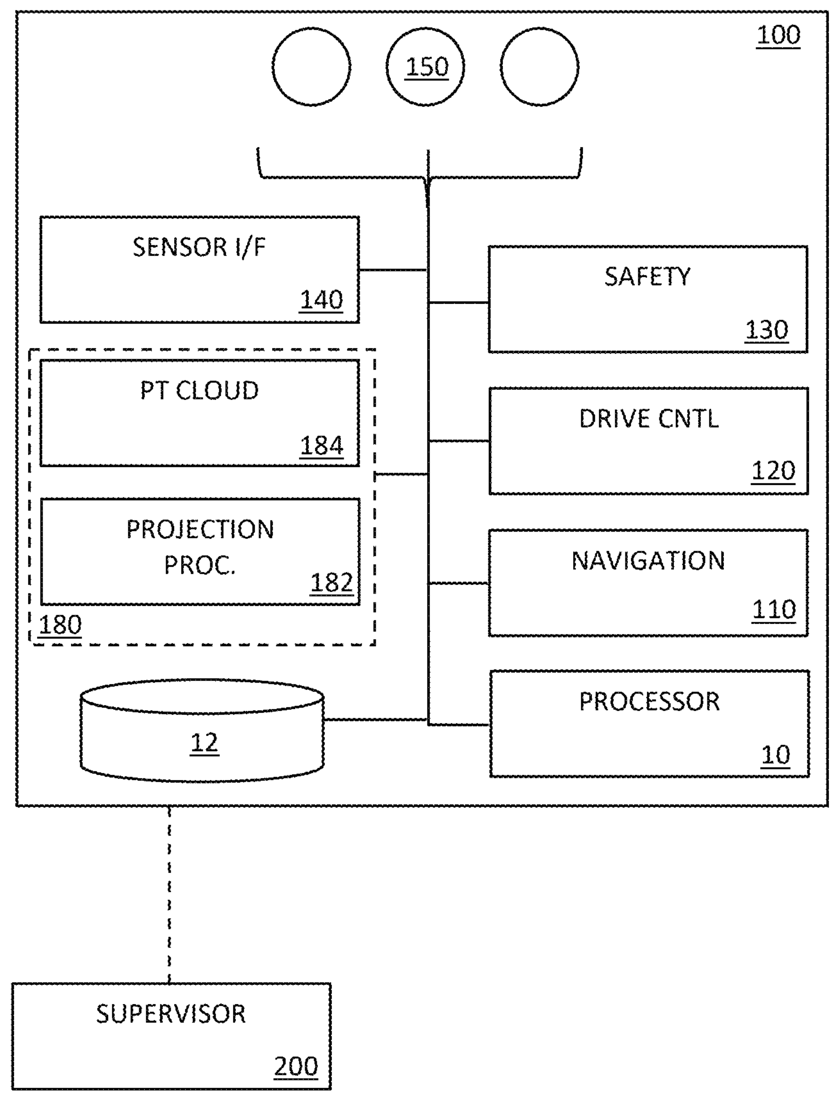
FIG. 1 is a block diagram of an embodiment of a self-driving vehicle, in accordance with aspects of the inventive concepts.

FIG. 1 is a block diagram of sense and control components of an example embodiment of a vehicle 100 incorporating path adaptation technology in accordance with principles of inventive concepts. In this example embodiment, the vehicle is a self-driving AV 100, which can interface and exchange information with one or more external systems, including a supervisor system 200. In various embodiments, the supervisor system 200 could be part of or in communication with a warehouse management system (WMS) that performs, for example, fleet management and monitoring for a plurality of vehicles (e.g., AVs) and, optionally, other assets within the environment. The supervisor system 200 can be local or remote to the environment, or some combination thereof.

In various embodiments, the supervisor system 200 can be configured to provide instructions and data to the vehicle 100, and to monitor the vehicle. The vehicle 100 and the supervisor 200 can communicate over any now known or hereafter developed communication technology, such as various types of wireless technology.

As an example, the supervisor system 200 (and/or WMS) could wirelessly communicate a route, including a path, for the vehicle to navigate for the vehicle to perform a task or series of tasks. The route and path can be relative to a map of the environment stored in memory and, optionally, updated from time-to-time in real-time from vehicle sensor data. As an example, in a warehouse setting, the route could include a plurality of stops along a path for the picking and loading and/or unloading of goods. The supervisor system 200 (and/or WMS) could also monitor the vehicle 100, such as to determine vehicle location within an environment, battery status or fuel level, and/or other operating, vehicle, and/or load parameters.

In example embodiments, a path may also be developed by "training" the vehicle 100. That is, an operator may guide the vehicle 100 through a route while the vehicle, through a machine-learning process, learns and stores the path for use in operation. The path may be stored for future use and may be amended, for example, to include additional stops, to delete stops, or to revise a route to an existing stop, as examples.

In example embodiments, vehicle 100 includes at least one processor 10 coupled to at least one memory 12 to cooperatively operate the vehicle and execute its functions or tasks. The memory 12 can include computer program instructions that are executable by the processor 10. The memory 12 can also store various types of data and information. Such data and information can include route data, path data, pick data, environmental data, and/or sensor data, as examples. The processor 10 and memory 12 are shown onboard the vehicle in FIG. 1, but external (offboard) processors and/or memory could additionally or alternatively be provided. That is, in various embodiments, the processing and computer storage capabilities can be onboard, offboard, or some combination thereof. For example, some processor and/or memory functions could be distributed across the supervisor system 200 (or WMS), other vehicles, and/or other systems external to the vehicle 100.

The vehicle 100 may include various functional modules and subsystems that enable the vehicle to perform its operations and tasks. A navigation module 110 may access environmental data and route and path information stored in memory 12, for example, and communicate instructions to a drive control subsystem 120 to cause the self-driving vehicle to navigate its route along the path. During vehicle travel, the navigation module 110 may receive information from one or more sensors 150, via a sensor interface (I/F) 140, to control and adjust the navigation in response to sensed objects and/or conditions in the environment, such as sensed objects or hazards and/or completion of a task.

The sensors 150 can include one or more stereo cameras, sonar sensors, lidar sensors, and/or volumetric sensors, as examples. Inventive concepts are not limited to particular types of sensors. In various embodiments, data from one or more of the sensors 150, e.g., one or more stereo cameras and/or lidar sensors, can be used to generate and update a 2-dimensional or 3-dimensional model of the environment, and data from one or more of the sensors 150 can be used for determining location of the vehicle 100 within the environment using, for example, odometry. Data from one or more of the sensors 150 can be used for path adaptation, including object detection and avoidance, during navigation. As will be described in greater detail below, sensors employed by vehicle 100 may include lidar sensors arranged to form "light curtains" and/or high-resolution 3-dimensional imaging sensors, such as stereo cameras arranged to provide 3-dimensional vision systems, as examples.

Examples of stereo cameras arranged to provide 3-dimensional vision systems for a vehicle, which may operate at any of a variety of wavelengths, are described, for example, in U.S. Pat. No. 7,446,766, entitled Multidimensional Evidence Grids and System and Methods for Applying Same and U.S. Pat. No. 8,427,472, entitled Multi-Dimensional Evidence Grids, which are hereby incorporated by reference in their entirety. Lidar systems arranged to provide light curtains, and their operation in vehicular applications, are described, for example, in U.S. Pat. No. 8,169,596, entitled System and Method Using a Multi-Plane Curtain, which is hereby incorporated by reference in its entirety.

A safety module 130 can also make use of data from one or more of the sensors 150 to interrupt and/or take over control of the drive control subsystem 120 in accordance with applicable safety standard and practices, such as those recommended or dictated by OSHA for certain safety ratings. In example embodiments, the path adaptation module 180 and/or the navigation module 110 may not override the safety module 130.

In example embodiments, a path adaptation module 180 is configured to generate a series of projections representative of the vehicle 100 along the vehicle's planned path to determine if sensed objects interfere with the vehicle's navigation along its planned path. Unless a sensed object is determined to overlap the vehicle's polygonal projections, the vehicle's navigation continues unabated. In example embodiments, the projections, e.g., 3-dimensional projections, are iteratively updated as the vehicle 100 moves along its assigned path. By producing updated 3-dimensional projections as the vehicle moves along its actual path, which may vary somewhat from its trained path, a system in accordance with principles of inventive concepts may provide a more accurate representation of the volume to be swept out by the vehicle's travel, allowing for more precise responses to potential collision threats and fine-tuned object avoidance. This swept volume may also be referred to as a "tunnel" representing the vehicles planned path as it continues to navigate.

In example embodiments, any shape or combination of shapes may be used for vehicle path projections, but a shape representative of the vehicle's shape and dimensions is preferred. Although inventive concepts will be described primarily in terms of polygonal projections, other shapes may be employed in accordance with principles of inventive concepts, such as curvilinear or rectilinear, three-dimensional, or two-dimensional shapes. Vehicle path projections may take into account load dimensions, which may vary along a route depending upon whether a vehicle is loaded (with a larger cross-section) or not (with a smaller cross-section), for example. In example embodiments, a system and method in accordance with principles of the inventive concepts may employ a trained/programmed path to generate a projection or series of projections along an entire path to be used for path adaptation.

In example embodiments, a path adaptation system and method in accordance with principles of inventive concepts employs one or more polygons or polyhedrons to project the 3-dimensional "tunnel" representing a volume that would be swept out by the vehicle if it were to proceed from its current location according to its assigned path. This tunnel is the vehicle path projection, i.e., the volume to be swept out by the vehicle as it travels through the environment. The vehicle's path may be developed through a training process that employs machine learning or may be provided by a supervisor or warehouse management system, for example. The 3-dimensional projection of the vehicle may be used in conjunction with sensor data to determine how, or whether, the vehicle is to proceed and/or adapt as it travels.

The sensor data collected by the sensors and used by the path adaption technology can represent objects in the path using point clouds, where points in a point cloud represents probabilities of occupancy in 3-dimensional space by an object or portion thereof. The vehicle may respond in various ways depending upon whether a point cloud based on the sensor data includes one or more points impinging upon, falling within an envelope of, or coincident with the 3-dimensional path projection (or tunnel) of the vehicle.

In example embodiments, the vehicle's projection processor 182 may generate the 3-dimensional path projection from its current location, which may differ from a location on the vehicle's trained path. That is, the vehicle may stray somewhat from its trained/prescribed path, due to environmental conditions, inexact odometry, or other causes, and, in accordance with principles of inventive concepts, projection processor 182 may generate a 3-dimensional path projection, or series of path projections, based on the actual location of the vehicle 100, rather than the planned location of the vehicle.

In operation, the 3-dimensional path projection generated by the path adaptation module 180 may be or include a series of projections updated as the vehicle transits its path. In some embodiments the projections may be updated on a regular basis. In some embodiments, projections may be updated at different rates, depending upon various factors, with, for example, updates occurring more frequently in areas along a projected path that are known to have heavier traffic, tighter running radii, or narrower openings. In some embodiments, updates can occur according to the speed at which the vehicle is traveling, with more frequent updates at higher rates of speed. In some embodiments, path projection updates are regularly generated at the highest frequency permitted by the capabilities of the processor, sensors, and other navigation and safety components.

Each of the series of 3-dimensional path projections for the vehicle may extend a predetermined distance and direction(s) or may extend a distance and directions(s) dependent upon path, progress, or environmental factors, for example. In some embodiments, path adaptation is provided in conjunction with other safety systems, such as those that are compliant with rules and guidelines promulgated by government agencies, such as OSHA guidelines, for example.

In some embodiments, 3-dimensional path projections may extend a preset distance in the direction of the vehicle's travel ("ahead" of the vehicle) that accounts for the vehicle's safe stopping distance, for example. In some embodiments, the safe stopping distance may vary according to whether the vehicle is loaded (carrying or pulling a load, for example) or not, what type of load (boxed, palleted, fragile, strapped, or pulled, as examples) or environmental factors. Such environmental factors can include surface conditions within a facility, the speed of operation of other vehicles within the facility, or traffic density, as examples.

The vehicle may be configured and adapted to employ a plurality of safety zones during navigation. For example, a primary safety zone, one compliant with OSHA or other government regulations, may operate as a "stop zone" within which the detection of any obstruction brings the vehicle to an immediate stop. A primary, or "stop," safety zone may be implemented using sensors that are situated above the floor and detect obstructions ahead of the vehicle using emitter/sensor combinations, such as lidar emitter/sensor combinations (also referred to herein as lidar sensors or, simply, as lidars), that emit a signal parallel to the floor and detect reflected light from an object to determine the distance to the reflecting object. One example of a primary safety such as this may be found in U.S. Pat. No. 9,910,137, entitled System and Method Using a Multi-Plane Curtain, which is hereby incorporated by reference in its entirety.

In example embodiments, a vehicle 100 may respond to any object detected within the primary safety zone by stopping and not resuming travel until all objects are out of the primary safety zone and/or an operator prompts the vehicle to resume travel. The vehicle may also activate an alert, by honking a horn, flashing a light, emitting an electronic signal, and/or other alerting means when an object is encountered within a primary safety zone. In various embodiments, the alert may be activated when the obstruction is first encountered, when the object clears the primary safety zone and the vehicle is about to resume movement, and/or periodically while the obstruction remains within the vehicle's primary safety zone. Electronic alerts may be transmitted to a supervisor system and/or a warehouse management system or to other vehicles, as examples.

In addition to a primary safety zone, such as just described, a vehicle 100 in accordance with principles of inventive concepts may otherwise employ various types of sensors and sensor data for navigation and path adaptation. In various embodiments, 3-dimensional path projections are generated to determine whether an object, as indicated by at least one point within a sensed point cloud, for example, falls within a 3-dimensional path projection, or tunnel, of the vehicle. The projections may take the form of a polyhedron or other solid form, for example. In example embodiments, when a vehicle detects an object within this projected tunnel volume, the vehicle may adjust its operation by slowing down in order to avoid collision with the object, for example. That is, rather than coming to a stop, if an object is detected within a secondary safety zone, the vehicle 100 may decelerate to avoid the object and to avoid the need to come to a complete stop, as it would if the object fell within the primary safety zone. In some embodiments, the vehicle 100 may adjust its operation by altering its path to avoid the detected object, e.g., by steering around and clear of the object or re-routing itself to avoid the detected object.

In example embodiments, the deceleration in response to a detected object within the secondary safety zone, which can be any scanned zone that is not the primary stop zone, may take any of a variety of profiles. For example, the vehicle may immediately decelerate to a predetermined low velocity, may step down its velocity to decreasingly lower speeds, or may gradually, smoothly, decelerate at a constant rate until a lower bound is reached, which may be a full stop. Similarly, when the vehicle determines that the obstruction is no longer within its 3-dimensional projected path, it may accelerate using any of a variety of acceleration profiles. In some embodiments, the acceleration and deceleration profiles may be influenced by load and environment conditions, such as those previously described.

In example embodiments a vehicle may project a primary zone or secondary safety zone based on the vehicle's 100 rate of travel or other factors. For example, a primary safety zone may be established at a distance in front of the vehicle ("front" is the direction of the vehicle's travel), wherein the distance allows the vehicle to safely come to a stop, without disturbing its load, before encountering the obstruction.

A plurality of secondary safety zones may be employed to a allow the vehicle 100 to anticipate and correct for the detection of any objects that may appear within the one or more secondary safety zones. As previously described, in example embodiments the vehicle 100 may react differently to an object within a secondary safety zone than it would to an object detected within a primary safety zone. With a plurality of secondary zones, based, for example, on distance from the vehicle, additional precautions may be taken, depending upon the degree of threat presented by sensed objects-objects in a more peripheral secondary safety zone may be treated with less caution than objects in a secondary safety zone that encompasses an area closer to the vehicle, for example.

In example embodiments, a first, or proximate, secondary safety zone may extend from the outer limits of a primary safety zone to a distance that corresponds to a deceleration/stopping distance for the vehicle. The stopping distance may vary according to whether the vehicle is loaded or unloaded, the type of load the vehicle may be loaded with, environmental conditions, etc. That is, the proximate secondary safety zone may extend from the outer edge of the primary safety zone to a location that, should an obstruction remain in place, would allow the vehicle to decelerate and, eventually, safely come to a stop if the obstruction remains in place. Additional safety zones, or extensions of the proximal safety zone, may accommodate longer range decision making.

In example embodiments, sensor data associated with object points may be accumulated and compared with sequential 3-dimensional safety path projections to determine, for example, whether an object associated with a detected point is moving toward, away from, or at an angle with respect to the path of the vehicle 100. Having that knowledge, the vehicle 100 may adjust its safety reaction behaviors, for example, by decelerating at an earlier point, i.e., sooner, if the object appears to be moving in the direction of the vehicle or its path, rather than the object being stationary or moving away from the vehicle 100.

In example embodiments, a 3-dimensional path projection may be directed straight ahead of the vehicle 100 with, for example, a primary axis at zero degrees to the vehicle's direction of travel. In some embodiments, a 3-dimensional path projection may be directed at an angle relative to the vehicle's current direction of travel. That is, if the vehicle's planned path would have it turn twenty degrees to port, the vehicle may anticipate such a turn and produce a 3-dimensional path projection that reflects that turn. This, vehicle path projections can have segments that are straight and/or curved.

In some embodiments, 3-dimensional path projections may be updated with sufficient frequency to obviate the need for such anticipation or forecasting, providing updated 3-dimensional path projections that, effectively capture actual turns in real-time or near real-time. As previously described, in some embodiments, the 3-dimensional path projection update rate may be according to the vehicle's speed of travel, load conditions and/or weight, and environmental conditions. In some embodiments, the 3-dimensional path projection update rate may be as frequent as permitted by sensor readout and processing electronics, for example.

Figure 2:
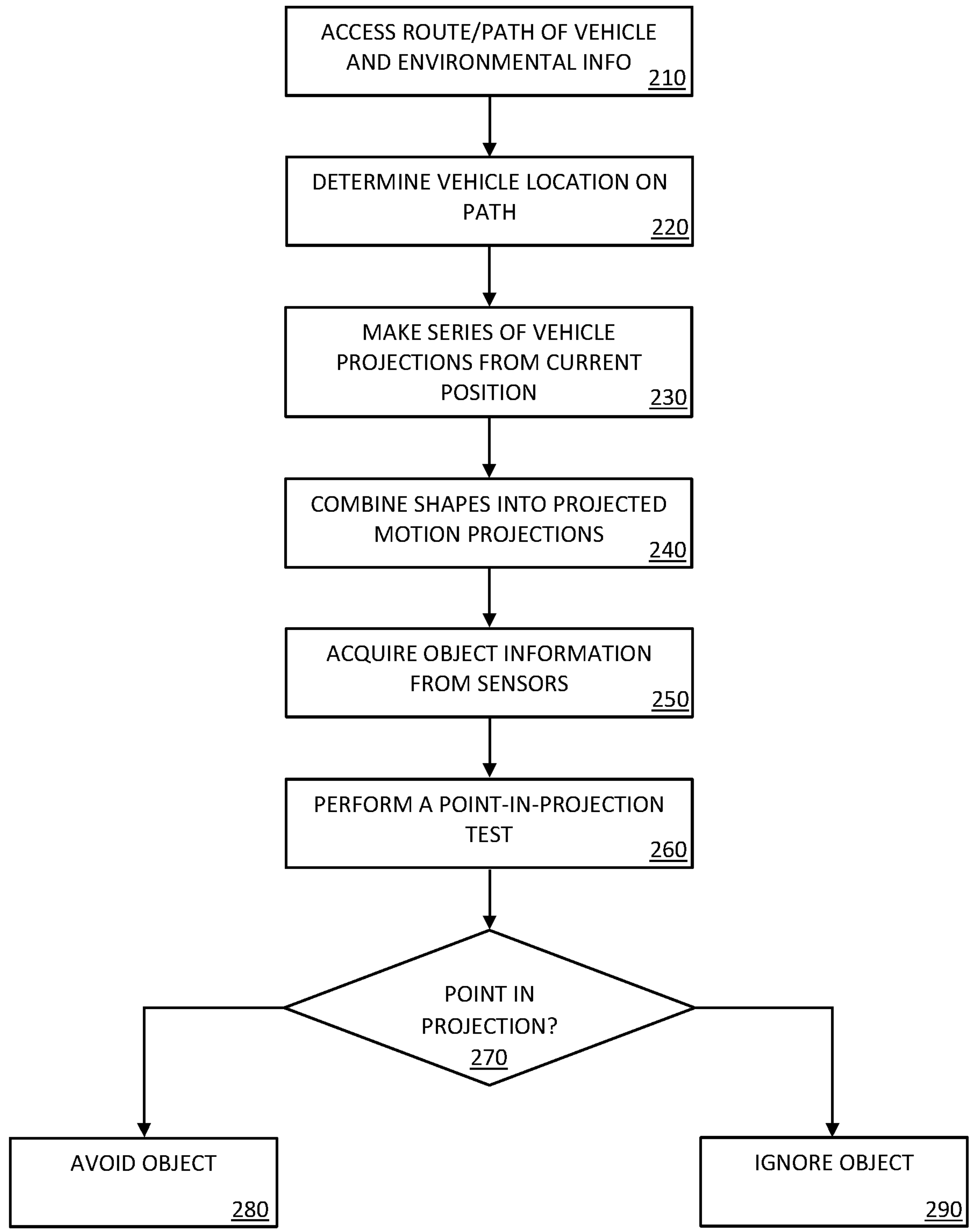
FIG. 2 is a flow diagram of an embodiment of a path adaptation method, in accordance with aspects of the inventive concepts.

FIG. 2 illustrates an example embodiment of a path adaptation method 200 that can be executed by the path adaptation module 180 of FIG. 1. In step 210, the path adaptation module 180 accesses the route and path information for the vehicle 100, e.g., from memory 12. In this step, environmental information may also be obtained, such as an electronic 2-dimensional or 3-dimensional representation of the environment, or at least the objects and structures therealong.

In step 220, a projection processor 182 of the path adaptation module 180 determines the vehicle's 100 location on its travel path. This may be done in real-time while the vehicle navigates along its path. In various embodiments, the system uses forward kinematic projections based on current odometry readings and the planned path of the vehicle to determine where the vehicle is going to travel, i.e., where the motion of the vehicle is projected from a current position of the vehicle. In step 230, the projection processor 182 makes a series of vehicle projections from the vehicle's current position. A 2-dimensional polygon or 3-dimensional polyhedron projection that is roughly the shape of the vehicle is placed at each projected position on the path, and then, in step 240, all of these shapes, e.g., polygons and/or polyhedrons, are combined as a union into a single vehicle path projection, or tunnel, representing the motion of the vehicle as it continues along its path. Preferably, the polygons or polyhedrons have a width that is approximately the width of the vehicle, but not less than the width of the vehicle. See, for example, FIGS. 3A and 3B.

The vehicle 100 may include right and left side object detecting or sensing technology (or sensors) that generate scanning zones that have a width greater than the width of the projected polygons. As previously indicated, although example embodiments describe the use of a 2-dimensional polygon, any shape, rectilinear or curvilinear, 2-dimensional or 3-dimensional, may be employed to form path projections for the vehicle, in accordance with principles of inventive concepts.

In step 250, the path adaptation module 180 acquires object information (sensor data) from onboard vehicle sensors, which may be distributed at different locations on the vehicle. In various embodiments, 3-dimensional point clouds are determined from data acquired by the onboard sensors of the vehicle 100 in the direction of the vehicle's path. For each point in a point cloud, a point-in-projection (e.g., in polygon and/or in polyhedron) test is performed in step 270 to determine whether or not the points from the cloud would collide or intersection with the vehicle as represented by the path projection. If the points are inside the volume swept out by the vehicle path projection as it is projected along the vehicle's path, the vehicle navigation is modified or halted to avoid the object, as in step 280. The path adaptation module 180, in cooperation with the navigation module 110, may allow the vehicle to navigate when an object is in the right and/or left object sensing field, but does not have a point within the projected path volume.

In various embodiments, when detecting whether an object is within a vehicle's 100 swept path of travel, as represented by its path projection, instead of stopping immediately, the vehicle can slow down as it approaches the detected object and only stop when it gets close, if necessary.

This allows for more controlled object avoidance and stopping, as well as allowing multiple self-driving vehicles to line up more closely when stopping. It also allows for a moving object to move out of the vehicle's projected travel path or tunnel before the vehicle gets to the originally determined point of collision. If the detected object points are outside the path projection, or tunnel, of the vehicle they can be ignored, as in step 290.

In various embodiments, Libpcl, a point cloud library, can be used for modeling the point cloud objects and Boost Geometry can be used for the polygon object and a point-in-polygon detection process.

Figure 3A:
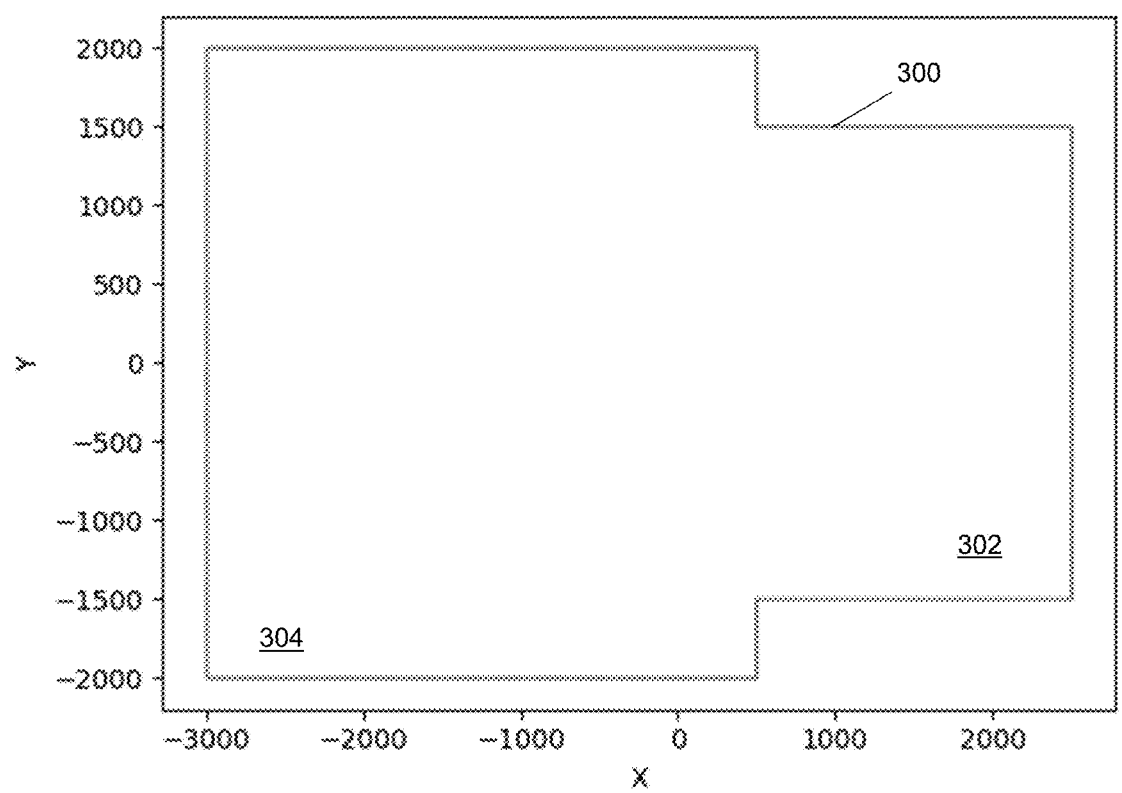
FIG. 3A illustrates a 2-dimensional projection of a 3-dimensional polyhedron representing an AV employed as projection element, in accordance with principles of inventive concepts.

Referring to FIG. 3A, in example embodiments, a 3-dimensional path projection may employ a polyhedron that has a 2-dimensional rectilinear projection onto a driven surface, as illustrated in the graphical representation of FIG. 3A. In this embodiment, the 2-dimensional projection 300 includes a narrower profile 302 at the front of the polyhedron and a wider profile 304 at the rear. In this embodiment, the wider part 304 encompasses the area around the forks on the pallet jack, which allows the path adaptation module to account for payloads being carried by the truck. The narrower part 302 represents the truck itself. In this illustrative embodiment, the center of the associated vehicle is located at (0,0). Distances are given in millimeters.

Figure 3B:
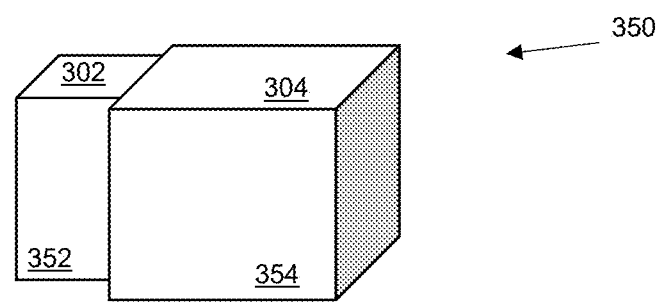
FIG. 3B is a 3-dimensional representation of the 3-dimensional polyhedron representing an AV employed as projection element, in accordance with principles of inventive concepts.

FIG. 3B illustrates a 3-dimensional vehicle representation 350 corresponding to the rectilinear polygon of FIG. 3A, with a first portion 352 combined with a larger second portion 354. As such, the path adaptation module 180 can generate and/or utilize single shaped vehicle representations or composite representations including a plurality of portions having different dimensions. Employing a 3-dimensional representation of the vehicle corresponding to this shape may more closely reflect the outline or envelope of a vehicle (and, optionally, a load) to thereby provide a more accurate 3-dimensional path projection and, correspondingly, more efficient operation of an associated vehicle.

Figure 4:
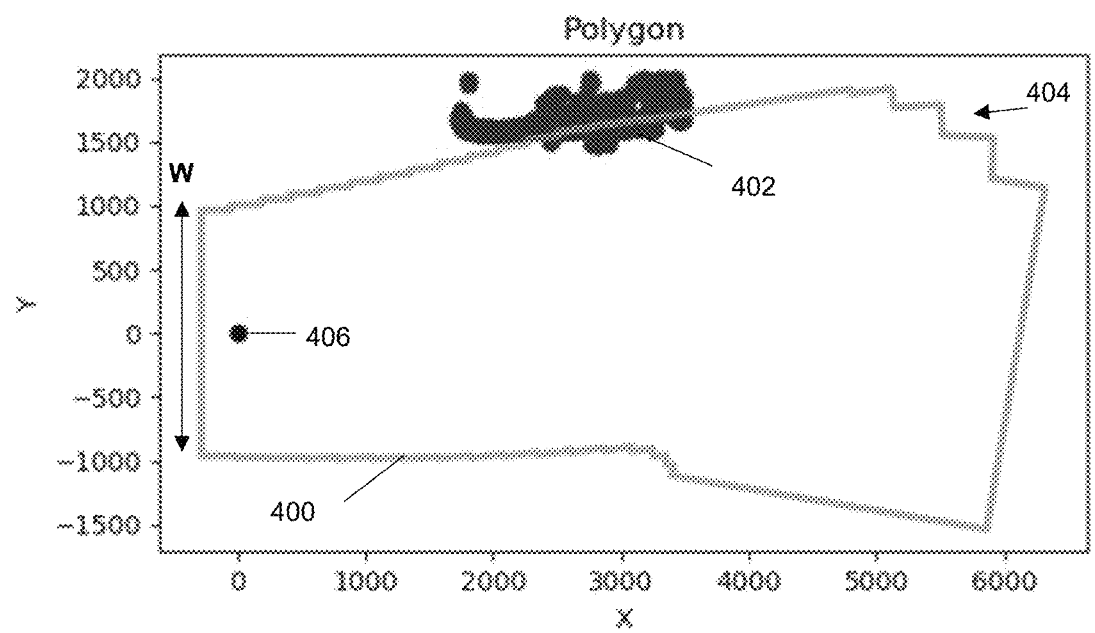
FIG. 4 is diagram of an example of an object point cloud overlaid on a vehicle path projection, in accordance with aspects of the inventive concepts.

FIG. 4 is diagram of an embodiment of a vehicle path projection, in accordance with principles of inventive concepts. In this example embodiment, the 3-dimensional point cloud 402 (described in greater detail in the discussion related to FIG. 5) is projected onto a 2-dimensional surface. Point 406 is the center of an AV, represented by box 410 in FIG. 5. The area enclosed by line 400 is a 2-dimensional projection onto a plane representative of a floor surface of a 3-dimensional path projection, in accordance with principles of inventive concepts. In this example embodiment, the path outline 400 reflects movement of the AV in the positive X direction and, initially, toward the port (positive Y direction), then to starboard (negative Y direction). Distances are given in millimeters.

Width W of the projection path may be set to a value that accommodates the widest portion of the AV, for example. This value may vary according to whether the vehicle is moving a load that is wider than the widest cross section of the AV. In some embodiments, different widths (corresponding to different widths of polygons, polyhedrons, or curvilinear projections) may be employed on different segments of an AV's path, depending upon whether the vehicle is loaded or not, for example, at those path segments. In example embodiments, the 3-dimensional projected path may be updated as the AV moves, and the 2-dimensional projection of a projection path of FIG. 4, particularly, the stairstep feature 404 illustrates the updating process, with each "step" a result of an individual path projection update as the AV moves forward and to starboard.

Figure 5:
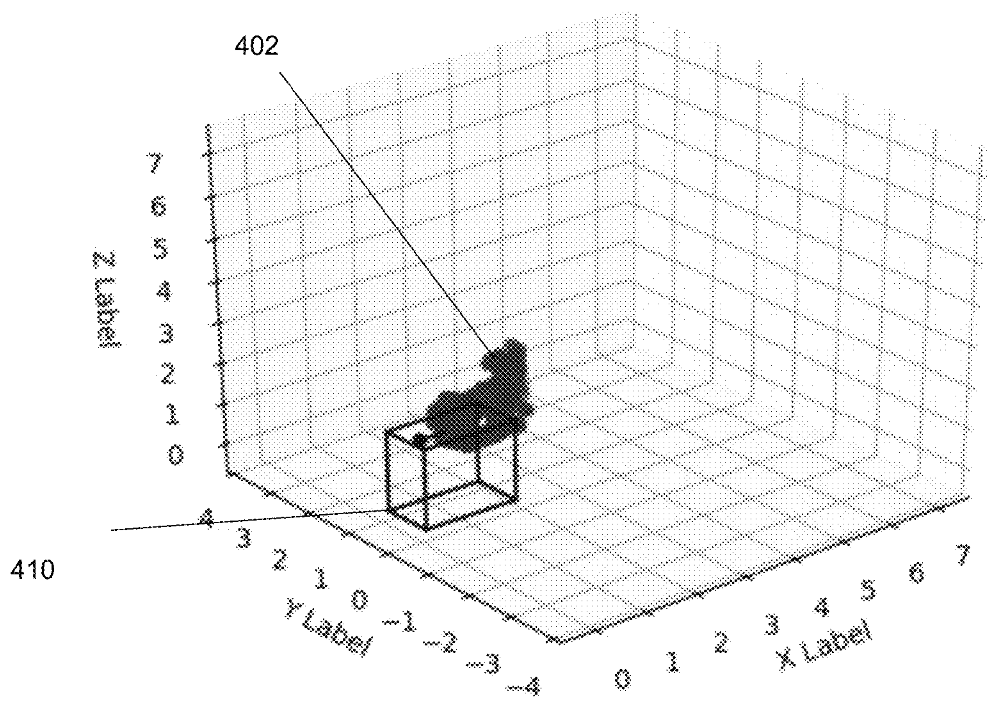
FIG. 5 shows a 3-dimensional graphical representation corresponding to the diagram of FIG. 4A.

The graphical representation of FIG. 5 illustrates volumetric sensing that may be used in AV path projections, in accordance with principles of inventive concepts. Box 410 represents a rough outline or, at least, a parallelogram that encompasses an AV in accordance with principles of inventive concepts. In this example, the direction of forward motion of the AV is in the increasing X direction, with distances in meters. Blob 402 represents a point cloud that may be generated by sensors, such as the lidar sensors or stereoscopic cameras or a combination thereof, for example. In some embodiments, point cloud 402 may be or include the lidar returns from another AV, for example. The object is located ahead of, that is, in the direction of travel and at a distance from, and to the port side of, the AV represented by box 410. As will be described in greater detail below, such a point cloud may be used in a system in accordance with principles of inventive concepts in determining whether a 3-dimensional path projection intersects with an object and, if so, what adaptations the AV 100 may make.

Figure 6:
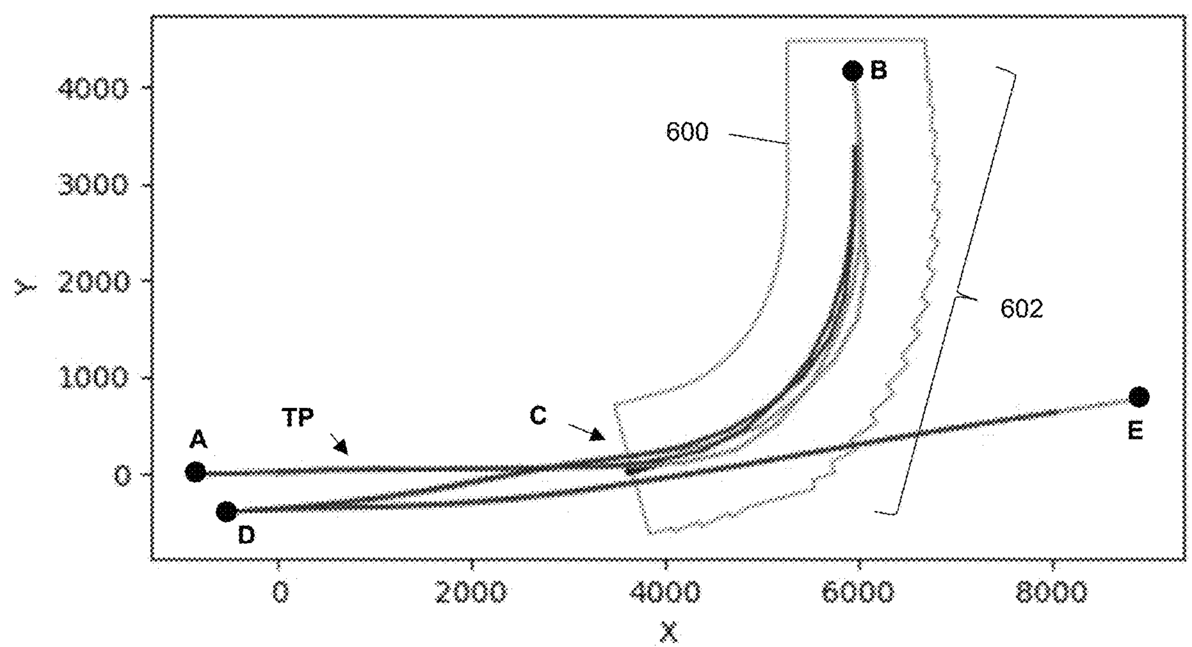
FIG. 6 is diagram of an example of traces of outlines, polygons in this example, projected on a vehicle path, in accordance with aspects of the inventive concepts.

Referring to FIG. 6, the graphical representation illustrates an example of the trace of a 2-dimensional projection 600 of a 3-dimensional path projection, in accordance with principles of inventive concepts. Distances here are given in millimeters. In this illustration, a vehicle's path begins at point A and proceeds to point B. Path projections, that is, 2-dimensional traces of 3-dimensional path projections, are only shown for illustrative purposes, for the vehicle's travel from point C to point B. The path projections may be generated, as previously described, as the vehicle proceeds along the trained path from point A to point B, from point B to point D, and from point D to point E, e.g., substantially along its trained path. The sawtooth region 602 illustrates the periodic updating of the 3-dimensional path projection as the vehicle proceeds, substantially, along its trained path. Minor variations between the trained path and actual travel path may be seen in the stretch of travel between points C and B.

As previously indicated, a path projection system in accordance with principles of inventive concepts may generate path projections as the vehicle moves along its actual travel path, which may vary from its trained path. Using the vehicle's actual position rather than a planned or trained position may provide a more accurate analysis, for example, of whether points within a detected point cloud will fall within a vehicle's "sweep volume" (that is, the volume swept out by the vehicle and, optionally, its load, as it travels along its path) and therefore, whether corrective/cautionary measures, or adaptations, should be taken by the vehicle.

In some embodiments, vehicles may be trained to stop along their paths, for example, to wait for a gate to open and/or to pause of a period of time at different types of stops. This may be referred to as a "trained stop." In accordance with principles of inventive concepts, 3-dimensional path projection activity may continue even as the vehicle is stopped or pausing, in order to ensure that objects entering the vehicle's path are not overlooked. In example embodiments, an AV may continue to project its motion while stopped or paused but, if the AV has reached a trained stop, the AV may not project its motion beyond the trained stopping point until it is ready to resume motion. In this manner an AV may reach a trained stopping position and stop there, rather than unnecessarily stopping if an obstruction were detected beyond that position. Similarly, in some embodiments when a vehicle stops to initiate a 180 degree change in direction, motion is projected up to the trained stop point and continue to project until the vehicle stops and is ready to start moving in the other direction. When the vehicle is ready to move in the other direction, the vehicle projects motion in the new direction.

Figure 7:
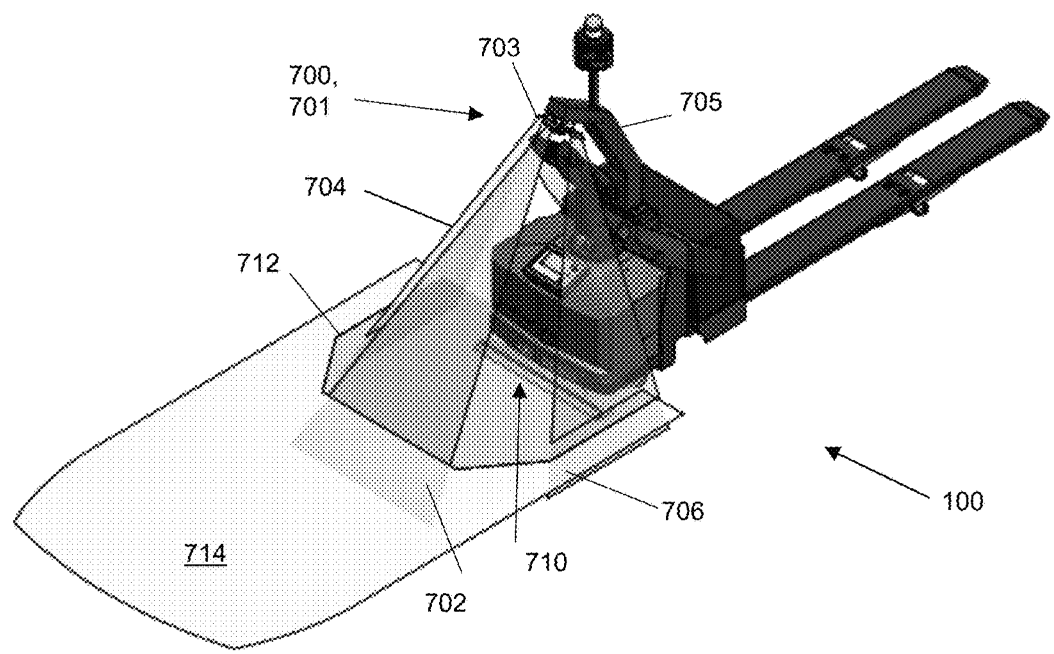
FIG. 7 shows an example of an AV employing a light curtain, in accordance with principles of inventive concepts.

FIG. 7 shows a perspective view of a material transport AV 100 including a multi-plane scanner system 700 that may be employed in conjunction with vehicle path adaptation system and method, in accordance with principles of inventive concepts. An embodiment of a multi-plane scanner system is described in greater detail in U.S. Pat. No. 9,910,137, previously referenced. In this embodiment, multi-plane scanner system 700 includes a laser scanner 701 and mirror 703 combination mounted to a mast 705, which maintains the multi-plane scanner above the ground and near the top of the vehicle.

The multi-plane scanner 701 is mounted relative to the mirror 703 such that a scanning beam emitted from the scanner 701 reflects downwardly from the at least one mirror 703 to generate a plurality of scanning planes 702, 704, and 706 that collectively form a "light curtain" that intersects a ground surface.

The vehicle 100 also includes a bottom laser range scanner 710 that projects a safety (or stop) zone 712 and a warning zone 714. This sensor 710 can be monitored and controlled by safety system 130. In example embodiments, single plane lidar "hard stop" safety zone 712 may be used in forward vehicle movement and the same can be done for movement in the opposite, reverse direction. These stop zones can be implemented in accordance with government mandated regulations, for example, OSHA regulations. Path projection sensors may be supplemented by the bottom laser range scanner 710, in accordance with principles of inventive concepts. In such cases, the adaptation technology 180 does not override mandated safety features of the vehicle.

Vehicle 100 further includes a controller or processor 10 to which laser scanner 701 and a bottom laser scanner 710 can be coupled, which communicates with safety system 130, drive control system 120, and navigation system 110. The controller is coupled to a vehicle drive control system 120 to control the travel operations of the vehicle. In response to the sensing of objects by one of the various sensor systems causes the control system to instruct the drive control system to alter the vehicle drive operation.

In the illustrative embodiment, laser range scanner 701 that generate the light curtain is a S100 laser range scanner by SICK, Inc. of Waldkirch, Germany. Although the LSM100, S300, and S3000 models are other examples of a suitable laser range scanner, also by SICK, Inc. The laser scanner 701 points about 34 degrees above horizontal and about 66 inches above the ground surface. The front plane 702 has a field ground projection of about 1100 mm from the front of the vehicle 100 and the side planes 704, 706 have field ground projections of about 700 mm from the center of the front of the vehicle 100. These are examples, specific dimensions can differ depending, for example, on the vehicle.

In example embodiments, the path adaptation module 180 will generate a 3-dimensional path projection from the current location of a vehicle 100. Points that fall within that 3-dimensional path projection, whether generated by a multiplane scanner as in FIG. 7 or by a 3-dimensional sensor system as described below, or some combination thereof, may trigger an adaptive response by the vehicle 100 (for example, slowing, stopping, avoidance), in accordance with principles of inventive concepts.

Figure 8A:
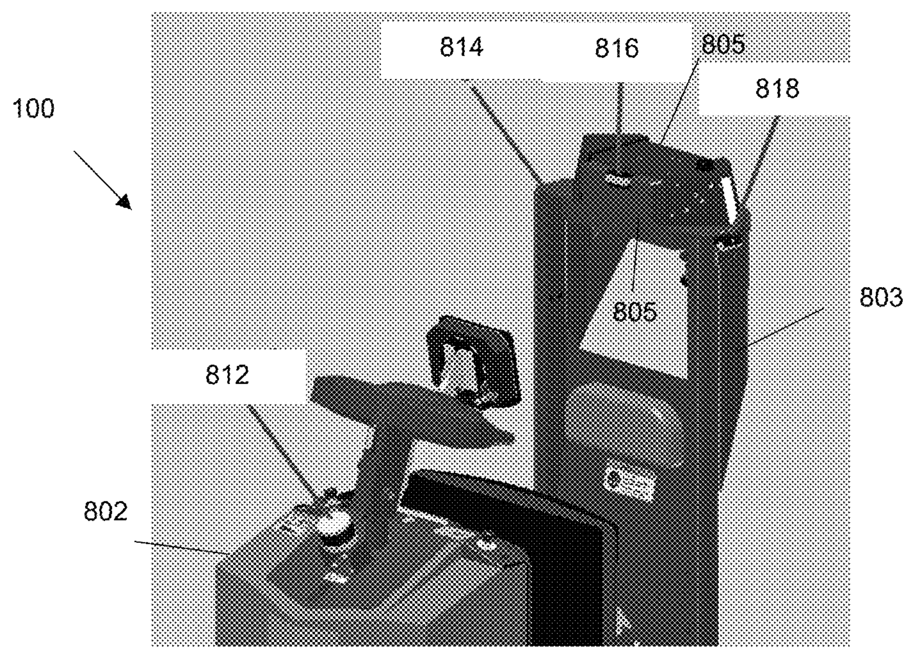
FIGS. 8A and 8B illustrate examples of placement of sensors or sensor systems on an AV, in accordance with principles of inventive concepts.
Figure 8B:
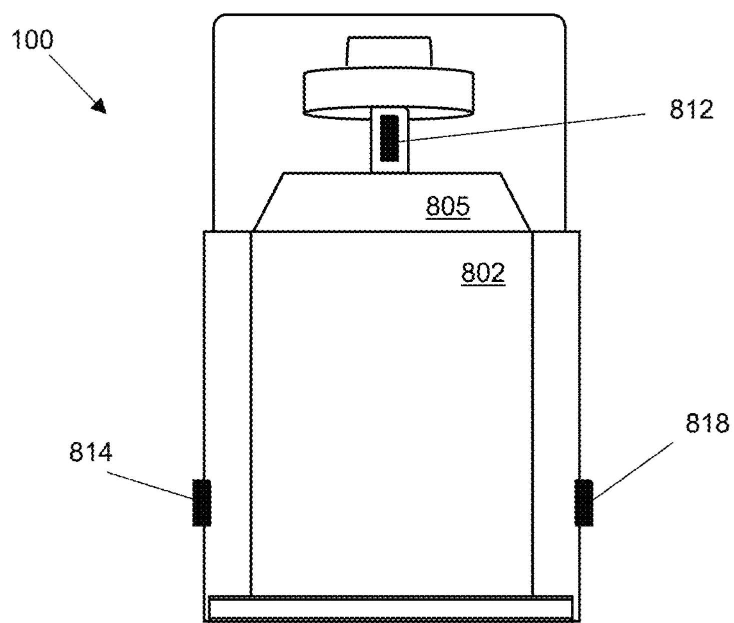

FIGS. 8A and 8B shows examples of self-driving AVs 100 that can incorporate path adaptation technology, in accordance with aspects of the inventive concepts. In various embodiments, the AV 100 can be a pallet truck, stacker, tugger, or carrier, as examples. In other embodiments, the AV can by any other type of self-driving vehicle, e.g., an automobile. The present invention is not inherently limited to warehouse vehicles.

Figure 9A:
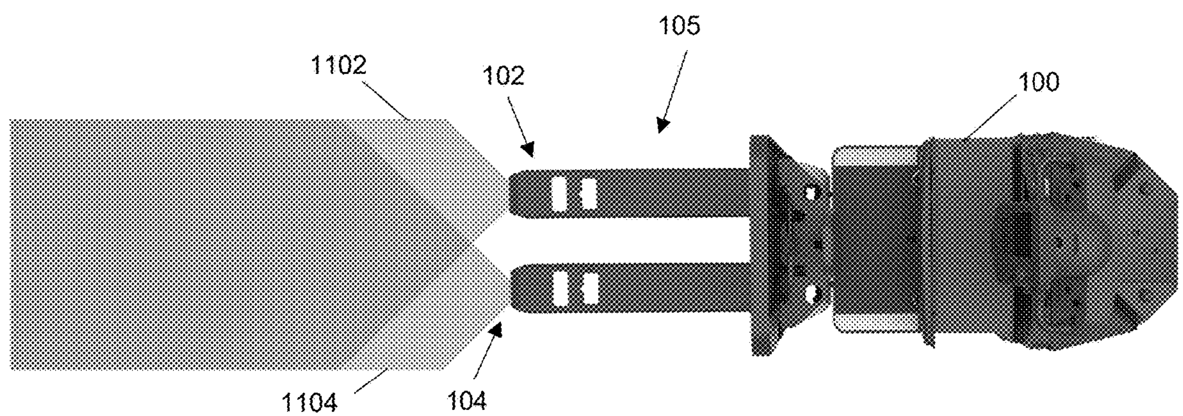
FIGS. 9A and 9B illustrate coverage fields provided by lidar sensors positioned within fork tips of an AV, in accordance with principles of inventive concepts.
Figure 9B:
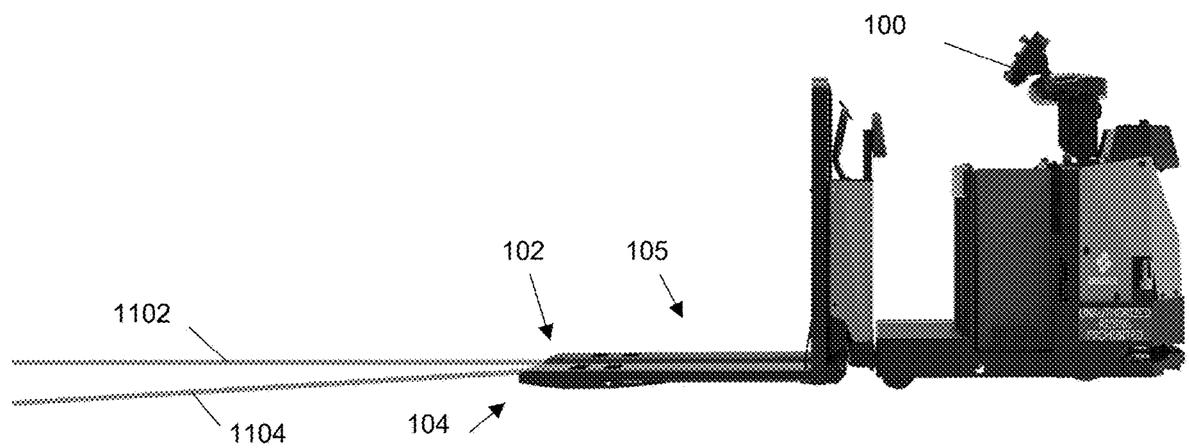

A multiplane scanning system can be included, as shown in FIG. 7. Optionally, line lidar scanners may be included in fork tips and may be used to provide lidar sensing for the rear of the vehicle, as is shown in FIGS. 9A and 9B. Volumetric lidar sensors that spin and sweep to sense around the front, sides, and rear of the vehicle may be included and mounted on either side or the front of the AV, as examples.

FIG. 8A illustrates example placement of sensors on an AV 100, in accordance with principles of inventive concepts. In the example of FIG. 8A, sensors are located on a hood 802 and on a mast 803 at or near the top of the vehicle 100 with a stereo camera head 805. In this embodiment, the sensors 814, 816, and 818 on the mast 803 are located at the right, center, and left, respectively, relative to the stereo camera head 805.

FIG. 8B shows a different AV with the sensors 812, 814, 818 mounted in different locations. Right and left sensors 814, 818 are mounted in sides of the hood 802. A center sensor 812 can be mounted on a column supporting a steering apparatus.

In example embodiments, volumetric lidar sensors used for any of sensors 812, 814, 816, 818 may be Laser Bear Honeycomb™ sensors that provide 95° vertical field of view, available from Waymo Corporation, Mountain View California. Other types of volumetric sensors could be used. Volumetric sensors may use, for example, a lidar sensor such as a one available from Velodyne Lidar, San Jose, California. Illustrative examples of volumes sensed by the sensors will be described in greater detail in the discussion related to the following figures.

The graphical representations of FIGS. 8C through 8G illustrate examples of volumetric sensing for an AV 100 as illustrated in FIG. 8A. Such sensing may employ volumetric sensors, as previously described, and may be employed to determine whether any objects lie within a 3-dimensional path projection volume generated by the path adaptation module 180, in accordance with principles of inventive concepts.

Figure 8C:
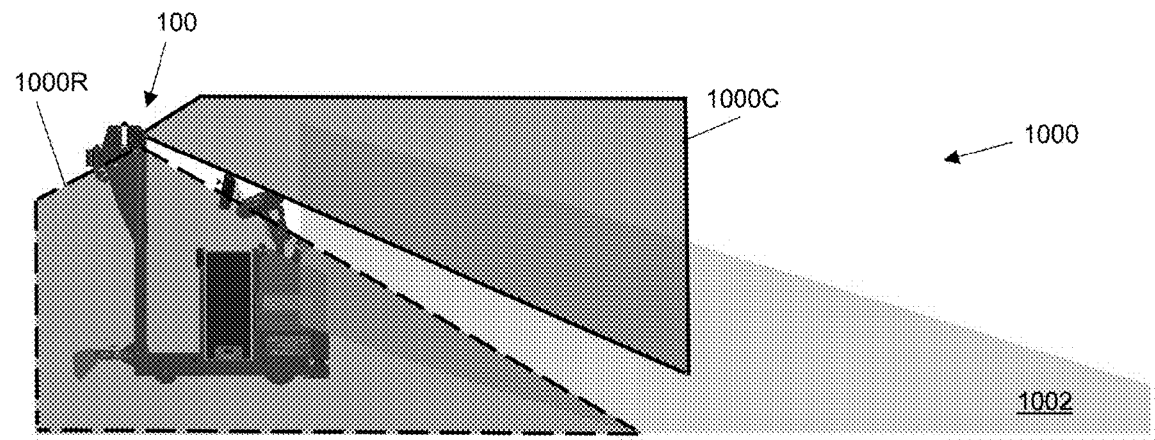
FIGS. 8C through 8G illustrate examples of volumetric sensing that may be employed by an AV, in accordance with principles of inventive concepts.
Figure 8D:
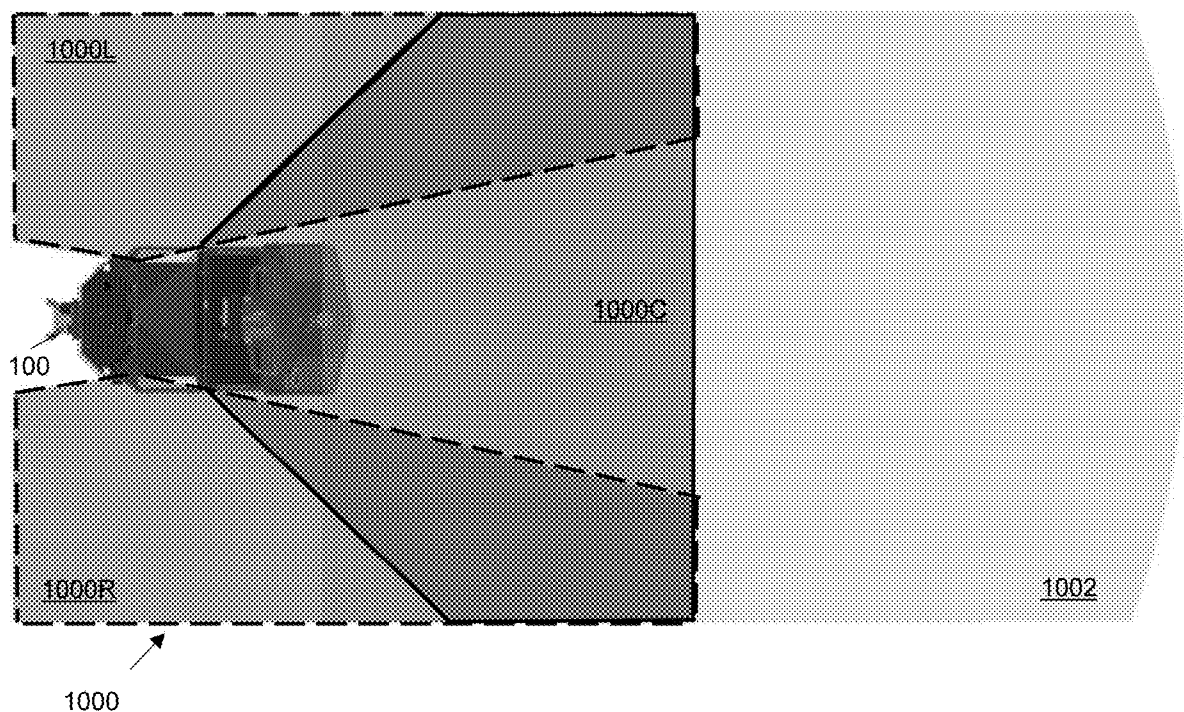

FIGS. 8C and 8D provide exemplary side and top views, respectively, of 3-dimensional sensor coverages for the AV 100, in accordance with principles of inventive concepts. In this example embodiment, a sensed volume 1002 of FIGS. 8C and 8D is provided by the hood sensor system 812 of FIG. 8A. Sensed volumes 10004L and 10004R, with dashed outline, are provided by the left sensor system 814 and the right sensor system 818, respectively, of FIG. 8A. Sensed volume 1000C, in solid outline, is provided by the center sensor system 814 of FIG. 8A. In example embodiments, sensor systems 812, 814, 816, and 818 may be any of a variety of volumetric sensors, such as the lidar sensors described above.

Figure 8E:
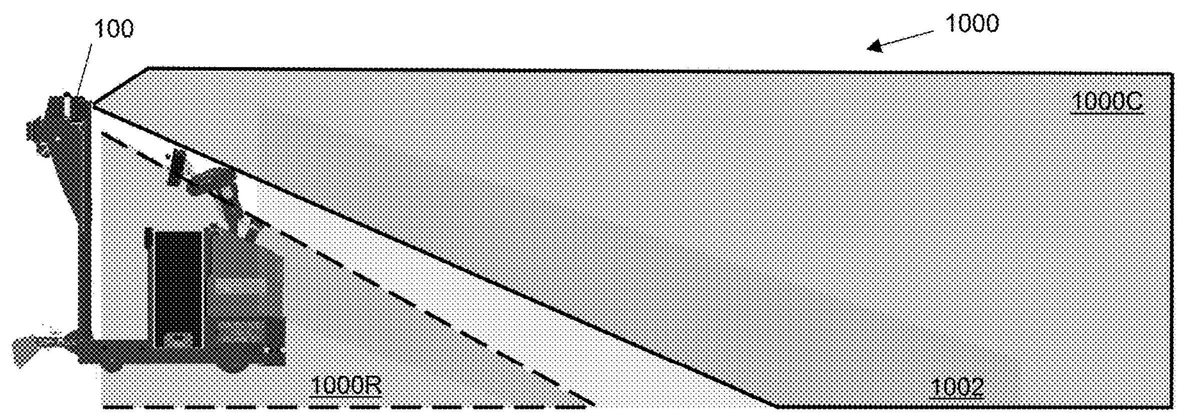

FIG. 8E provides an alternative embodiment to the volumetric sensing of FIG. 8C, where sensed volume 1000C, in solid outline, which is provided by the center sensor system 814 of FIG. 8A, is further extended.

Figure 8F:
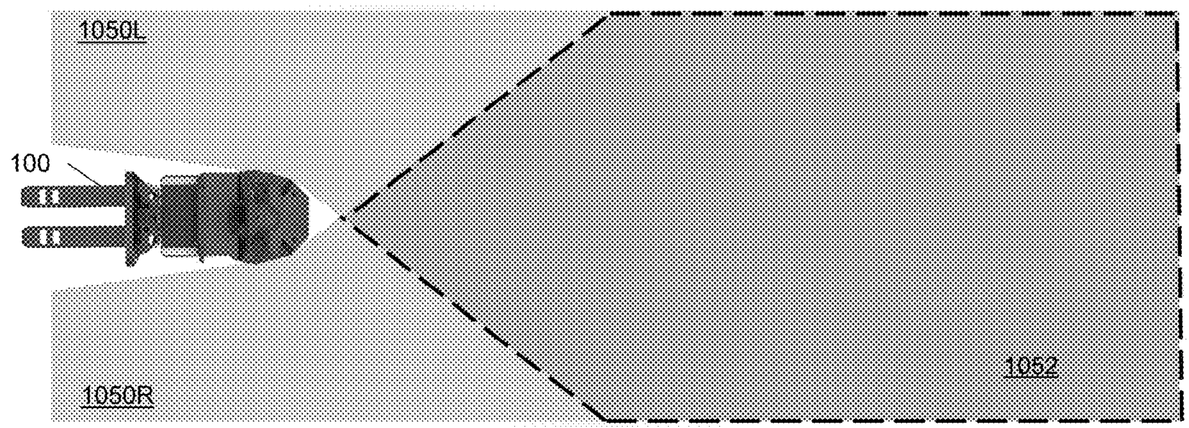
Figure 8G:
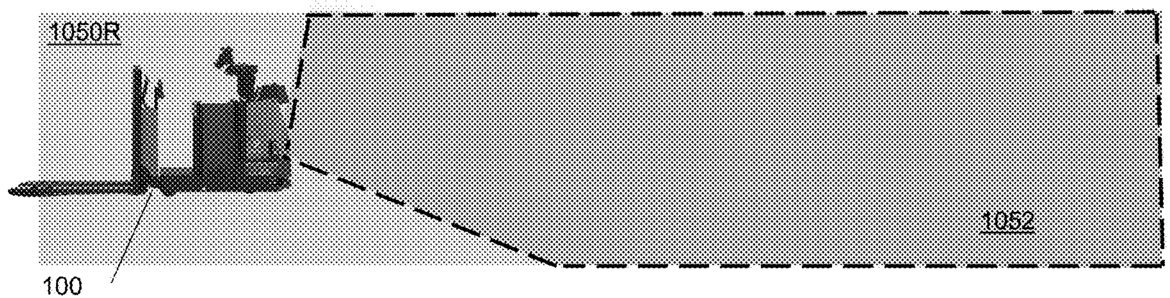

The graphical representations of FIGS. 8F and 8G illustrate examples of volumetric sensing for an AV 100 as illustrated in FIG. 8B. These figures illustrate left and right-side volumetric sensing from a top view (FIG. 8F) and illustrating left-side and right-side volumetric sensing from a side view (FIG. 8G). Such sensing may employ volumetric sensors, as previously described, and may be employed to determine whether any objects lie within a 3-dimensional path projection volume generated by the path adaptation module 180, in accordance with principles of inventive concepts.

FIG. 8F provides a top view of an alternative embodiment to the volumetric sensing of using side sensors, such as side sensors 814, 818 of FIG. 8B. Here, right-side sensor 814 generates sensed volume 1050R and left-side sensor 818 generates sensed volume 1050L, which overlap in region 1052, in dashed lines.

FIG. 8G provides a side view to the volumetric sensing of FIG. 8F, where the overlapped sensed volume is shown in dashed outline.

FIGS. 9A and 9B provide graphical representation that illustrate sensing fields generated by sensors positioned within an AV's 100 forks 105. FIG. 9A provides a top view and FIG. 9B provides a side view. In this embodiment, each of the forks 105 include a lidar scanners 102, 104 at their respective fork tips, i.e., an end of the fork distal from the vehicle body.

As previously indicated, such fork scanners 102, 104 can be BEA lidar sensors, available from BEA Americas, Pittsburgh, Pennsylvania. Such scanners, as sensors, may detect objects behind an AV 100, and provide sensor data used by the path adaptation module 180 to generate path projections and/or otherwise assist on path adaptation, in accordance with principles of inventive concepts. In this embodiment, scanner 102 produces scan zone 1002 and scanner 1004 produces scan zone 1004. In this embodiment, one scanner, scanner 102, is shown generating a scan zone that is substantially parallel to the ground surface. And scanner 104 is shown generating scan zone 1004 angled downward toward the ground surface. In such orientations, fork tip scanner 102 is configured and arranged to first detect an object in the path more distant from the forks 105 and fork tip scanner 104 is configured and arranged to detect an object closer to the forks 105.

In various embodiments, the fork tip scanners 102, 104 are optional in view of the more capable volumetric scanners otherwise disposed on the vehicle 105. When included, the fork tip scanners 102. 104 can be complimentary to the other volumetric scanners. In some embodiments, the lidar fork tip scanners can be replaced by volumetric scanners.

Figure 10A:
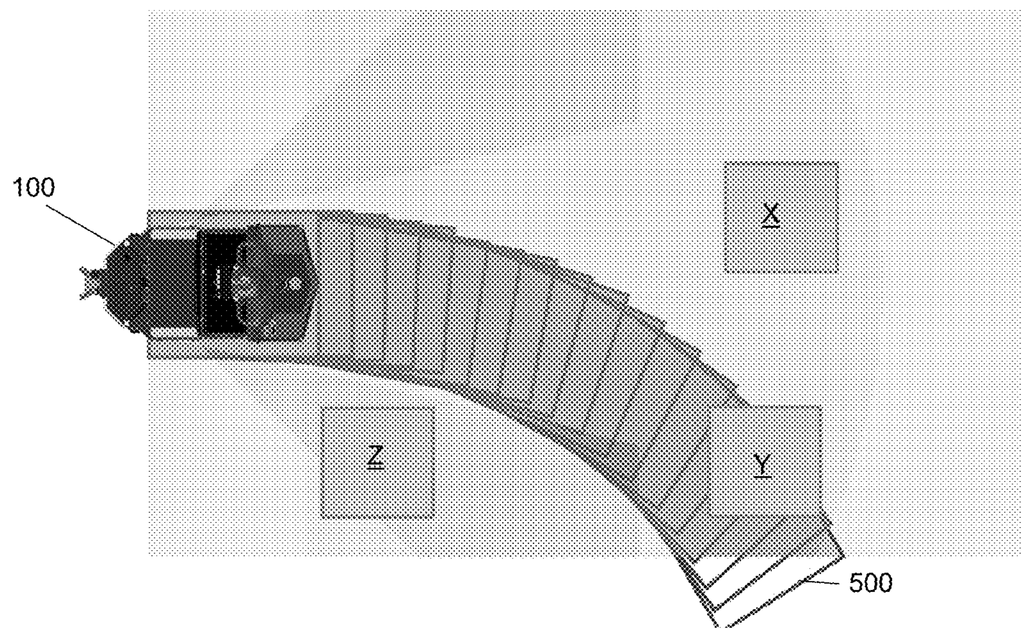
FIGS. 10A through 10C illustrate path projections of an AV, in accordance with principles of inventive concepts.
Figure 10B:
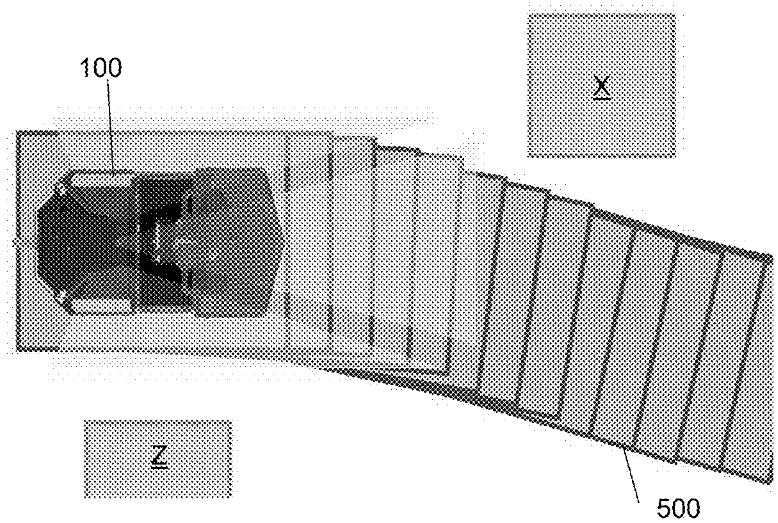
Figure 10C:
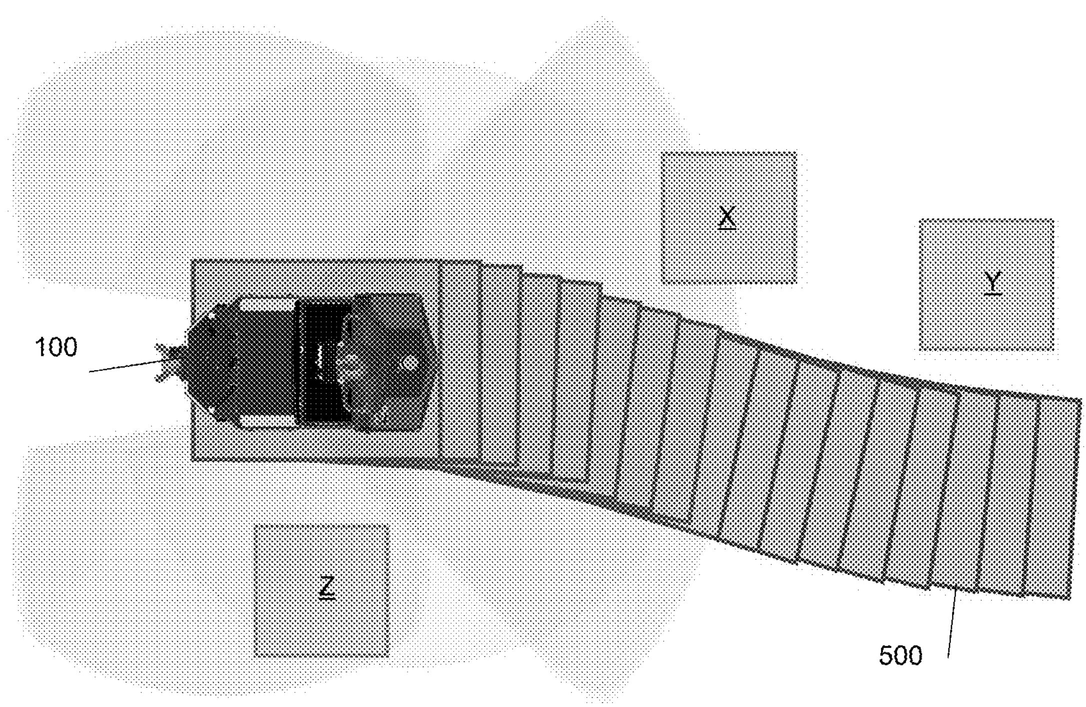

FIGS. 10A through 10C illustrate top views of path projections of an AV, in accordance with principles of inventive concepts. Object X, Y, and Z are shown in relation to the vehicle's projected path 500. The AV and sensor configurations of FIGS. 7, 8A, and 8B can be variously used to generate the path projections 500.

In FIG. 10A, the AV 100 generates volumetric sensing using at least side sensors and a center or forward center sensor. In FIG. 10B, the AV 100 generates volumetric sensing using at least a multiplane scanning system. In FIG. 10C, the AV 100 generates volumetric sensing using at least side sensors and two front mounted sensors, e.g., on a mast and on a hood. In FIG. 10A, object Y is in the AV's path and the vehicle with need to adapt, e.g., slow, stop, or reroute. In FIGS. 10B and 10C, the adaptation module 180 has communicated with the processor 10, navigation 110, and drive control 120 to adapt the vehicle's path 500 to avoid objects X, Y, and Z, based on the processing of volumetric sensing data.

Employing volumetric sensors in accordance with principles of inventive concepts provides more immediate detection of objects of interest along an AV's path. That is, projecting a 3-dimensional path volume and determining whether any points in a point cloud fall within that 3-dimensional projection may be more readily accomplished using 3-dimensional sensing than when using 2-dimensional sensing (provided, for example, by a lidar curtain). Employing a plurality of volumetric sensors in accordance with principles of inventive concepts generates denser, more accurate point clouds in regions of interest, allowing for a more accurate determination of whether objects fall, entirely or in part, within a path projection in accordance with principles of inventive concepts and, therefore, pose a collision hazard.

In example embodiments a "light curtain" configuration may sense objects approximately 1.5 meters in front of an AV, at or near ground level (for example, within two inches of ground level). In order to ensure that a path is clear for an associated AV to pass, a path may be projected ahead of the vehicle a distance that encompasses the entire length of the vehicle's chassis passing through the outward reach of the forward plane of the light curtain's sensing capabilities. Although 3-dimensional volumetric path planning projections in accordance with principles of inventive concepts may be projected any distance ahead, in some embodiments the projected distance may be determined and/or limited according to a vehicle's size, sensor technology, travel speed, characteristics of the planned path (for example, whether the path is relatively straight or winding), or environmental conditions. For example, 3-dimensional volumetric path planning projections can be determined, as least in part, based on whether or not the planned path passes through a heavily traveled area.

Although the path adaptation module 180 may update path projections at any rate within the capabilities of the sensor readouts and processing electronics and may update at a fixed or at a variable rate, in an example embodiment, path projections can be updated in coordination with other processing operations, such as odometry updates. In example embodiments, such a rate may be on the order of ten updates per second, e.g., a rate that ensures safe operation of an AV traveling at moderate speeds in a warehouse environment. Vehicles traveling at high rates of speed in a less controlled environment may employ higher update rates, in accordance with principles of inventive concepts.

Although 3-dimensional path projections in accordance with principles of inventive concepts may be employed in conjunction with the use of any type of sensors, for example, visual spectra camera, IR camera, stereo camera, planar lidar, volumetric lidar, etc., sensor systems that provide denser and more extensive detection fields allow for more accurate detection of objects and, in turn, permit the use of more refined path adaptation zones that allow an AV to travel in regions that may otherwise be difficult to navigate.

In example embodiments, a 3-dimensional path projection may be wider than a primary stop field (that is, a stop field mandated by governmental (OSHA, ICC), industry (SAE), or other standards) and may envelope the widest portion of a vehicle and/or its associated load.

While the foregoing has described what are considered to be the best mode and/or other preferred embodiments, it is understood that various modifications may be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

What is claimed is:

1. A path adaptation method for a self-driving vehicle, comprising:

navigating the vehicle on a planned path through an environment; and while the vehicle moves along the planned path:

determining a location of the vehicle relative to the planned path;

projecting the vehicle's travel, including:

generating a three-dimensional shape of variable dimension representing the vehicle and projecting the three-dimensional shape from the vehicle location along the planned path to form a plurality of projections; and combining the plurality of projections into a single, continuous, three-dimensional path projection along the planned path;

acquiring object information representing an object shape from one or more sensors; and determining if the object shape overlaps the three-dimensional path projection and:

if so, adjusting the vehicle navigation; or if not, continuing the vehicle navigation along the planned path.

2. The method of claim 1, wherein determining a location of the vehicle relative to the planned path includes processing forward kinematic projections based on current odometry readings for the vehicle.

3. The method of claim 1, wherein the environment is represented by an evidence grid.

4. The method of claim 3, further comprising representing the object shape with a point cloud in the evidence grid, wherein points in the point cloud indicate occupancy of a one or more points in space.

5. The method of claim 4, wherein determining if the object shape overlaps the three-dimensional path projection includes determining whether at least one point from the point cloud intersects with or is within the three-dimensional path projection.

6. The method of claim 1, wherein the evidence grid is a 3-dimensional evidence grid and the object information is 3-dimensional object information.

7. The method of claim 1, wherein the one or more sensors include stereo sensors, stereo cameras, lidar, and/or sonar.

8. The method of claim 1, further comprising representing the three-dimensional shape as a polyhedron.

9. The method of claim 1, further comprising generating the three-dimensional shape to have a first width that corresponds to an approximate width of the vehicle, and is not less than the width of the vehicle.

10. The method of claim 9, further comprising generating the three-dimensional shape to have a second width, different from the first width, that represents a width of a load transported by the vehicle.

11. The method of claim 1, wherein generating the three-dimensional path projection includes combining the plurality of projections into a 3-dimensional solid projection tunnel representing a volume that would be swept out by the vehicle.

12. The method of claim 1, wherein the vehicle generates a right object sensing field and/or a left object sensing field, and the method further includes:

enabling the vehicle to navigate on the planned path when an object is detected in the right and/or left object sensing field, but the object shape does not have a point on or within the three-dimensional path projection.

13. The method of claim 1, wherein adjusting the vehicle navigation includes adjusting a vehicle speed.

14. The method of claim 1, wherein adjusting the vehicle navigation includes slowing without stopping the vehicle.

15. The method of claim 1, wherein adjusting the vehicle navigation includes stopping the vehicle.

16. The method of claim 1, wherein adjusting the navigation includes adjusting the planned path to avoid the object.

17. The method of claim 1, wherein the vehicle planned path is a trained path.

18. The method of claim 1, wherein when the vehicle planned path includes a planned stop, the method includes:

projecting the vehicle motion to a trained stop, but not projecting the vehicle motion beyond the trained stop;

the vehicle stopping at the trained stop; and resuming projecting the vehicle motion beyond the trained stop when the vehicle is ready to resume navigation.

19. The method of claim 1, wherein when the vehicle planned path includes a change in direction, the method includes:

projecting the vehicle motion in the current direction up to a change of direction point;

the vehicle stopping or slowing to change from the current direction to the new direction at the change of direction point; and then projecting the vehicle motion in the new direction.

20. The method of claim 1, wherein the vehicle is an autonomous vehicle in the form of a pallet truck or tugger configured to transport a load.

* * * * *